United States Patent
Khandelwal et al.

(10) Patent No.: US 9,331,952 B2
(45) Date of Patent: *May 3, 2016

(54) MODIFYING AN ASSIGNMENT OF NODES TO ROLES IN A COMPUTING ENVIRONMENT

(71) Applicant: International Business Machines Corporation, Armonk, NY (US)

(72) Inventors: Nikhil Khandelwal, Tucson, AZ (US); Benjamin S. Terris, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 13/733,117

(22) Filed: Jan. 2, 2013

(65) Prior Publication Data

US 2014/0189085 A1    Jul. 3, 2014

(51) Int. Cl.
*H04L 12/911* (2013.01)
*H04L 12/24* (2006.01)
(Continued)

(52) U.S. Cl.
CPC ............ *H04L 47/70* (2013.01); *H04L 41/08* (2013.01); *H04L 41/0896* (2013.01); *H04L 41/5025* (2013.01); *H04L 41/5096* (2013.01);
(Continued)

(58) Field of Classification Search
CPC . G06F 9/50; G06F 2201/81; G06F 2209/503; G06F 3/0608; G06F 3/0631; H04L 47/70; H04L 63/10
See application file for complete search history.

(56) References Cited

U.S. PATENT DOCUMENTS

| 6,850,895 | B2 * | 2/2005 | Brodersen | ............. G06Q 10/06 705/7.14 |
| 7,039,694 | B2 * | 5/2006 | Kampe | ............... H04L 12/2602 709/216 |

(Continued)

FOREIGN PATENT DOCUMENTS

| WO | 02089014 | 11/2002 |
| WO | 2011025670 | 3/2011 |

OTHER PUBLICATIONS

Office Action, dated Jun. 15, 2015, for U.S. Appl. No. 14/073,876, filed Nov. 6, 2013, invented by Nikhil Khandelwal et al., Total 7 pages.

(Continued)

*Primary Examiner* — Lashonda Jacobs
(74) *Attorney, Agent, or Firm* — David W. Victor; Konrad, Raynes, Davda and Victor LLP

(57) ABSTRACT

Provided are a computer program product, system, and method for modifying an assignment of nodes to roles in a computing environment. There are a plurality of resource thresholds for each of a plurality of roles, wherein each role defines a type of operations and node resource usage for the nodes, and a measurement of node resource usage for the nodes. For at least one of the node, operations are performed comprising: determining at least one of the roles assigned to the node; determining a role resource threshold for each role assigned to the node; determining whether the measured node resource usage at the node exceeds the determined role resource thresholds for each role assigned to the node, wherein the role having the determined resource threshold exceeded by the node resource usage comprises a role to adjust; and determining a modification of the assignment of nodes to the role to adjust.

20 Claims, 10 Drawing Sheets

(51) Int. Cl.
*H04L 12/26* (2006.01)
*H04L 12/917* (2013.01)
*H04L 12/913* (2013.01)

(52) U.S. Cl.
CPC .............. *H04L43/08* (2013.01); *H04L 47/724* (2013.01); *H04L 47/76* (2013.01); *H04L 47/822* (2013.01)

(56) References Cited

U.S. PATENT DOCUMENTS

| | | | | |
|---|---|---|---|---|
| 7,543,046 | B1* | 6/2009 | Bae | G06F 15/16 709/220 |
| 8,886,705 | B1* | 11/2014 | Tewari | G06F 17/30209 709/203 |
| 2005/0071470 | A1* | 3/2005 | O'Brien | G06F 11/2097 709/226 |
| 2006/0015505 | A1* | 1/2006 | Henseler | G06F 9/50 |
| 2006/0026161 | A1* | 2/2006 | Henseler | G06F 17/30224 |
| 2006/0089932 | A1* | 4/2006 | Buehler | H04L 63/105 |
| 2007/0011485 | A1* | 1/2007 | Oberlin | G06F 9/5072 714/4.1 |
| 2007/0094343 | A1* | 4/2007 | Sangle | H04L 67/1095 709/207 |
| 2008/0168532 | A1* | 7/2008 | Carter | G06Q 10/06 726/1 |
| 2010/0011098 | A1* | 1/2010 | Sanborn | H04L 67/104 709/223 |
| 2010/0250734 | A1* | 9/2010 | Ajiro | G06F 9/5083 709/224 |
| 2011/0191485 | A1* | 8/2011 | Umbehocker | G06F 21/6218 709/229 |
| 2011/0282982 | A1 | 11/2011 | Jain | |
| 2011/0301998 | A1 | 12/2011 | Talwar et al. | |
| 2012/0054347 | A1 | 3/2012 | Lee et al. | |
| 2012/0054624 | A1 | 3/2012 | Owens, Jr. et al. | |
| 2013/0182558 | A1* | 7/2013 | Orten | H04W 84/18 370/216 |
| 2014/0189130 | A1 | 7/2014 | Khandelwal et al. | |

OTHER PUBLICATIONS

Response to Office Action, dated Apr. 13, 2015, for U.S. Appl. No. 14/073,876, filed Nov. 6, 2013, invented by Nikhil Khandelwal et al., Total 10 pages.

US Patent Application, dated Nov. 6, 2013, for U.S. Appl. No. 14/073,876, filed Nov. 6, 2013, invented by Nikhil Khandelwal et al., Total 37 pages.

Preliminary Amendment, dated Nov. 6, 2013, for U.S. Appl. No. 14/073,876, filed Nov. 6, 2013, invented by Nikhil Khandelwal et al., Total 6 pages.

Preliminary Amendment, dated Oct. 30, 2014, for U.S. Appl. No. 14/073,876, filed Nov. 6, 2013, invented by Nikhil Khandelwal et al., Total 2 pages.

Office Action, dated Jan. 29, 2019, for U.S. Appl. No. 14/073,876, filed Nov. 6, 2013, invented by Nikhil Khandelwal et al., Total 10 pages.

Response to Office Action, dated Apr. 13, 2015, for U.S. Appl. No. 14/073,876, filed Nov. 6, 2013, invented by Nikhil Khandelwal et al., Total 6 pages.

Final Office Action, dated Oct. 2, 2015, for U.S. Appl. No. 14/073,876, filed Nov. 6, 2013, invented by Nikhil Khandelwal et al., Total 19 pages.

Response to Final Office Action, dated Dec. 16, 2015, for U.S. Appl. No. 14/073,876, filed Nov. 6, 2013, invented by Nikhil Khandelwal et al., Total 11 pages.

"Tier 3 Adds Predictive Autoscaler, Virtualized Load Balancer to Enterprise-class Hybrid Cloud", (online) PR Web, retrieved from the internet at URL>http:www.prweb.com/releases/2011/10/prweb8849697.htm, dated Oct. 4, 2011, pp. 1-2, Bellevue WA.

"The Enterprise Cloud Platform for Mission-Critical, Production Applications", Tier 3 Enterprise Cloud Platform technical data sheet, dated 2011, pp. 1-4.

S. Daniel et al., "Prediction-based Virtual Instance Migration for Balanced Workload in the Cloud Datacenters", Department of Computer Science Rochester Institute of Technology, 2011, pp. 1-5.

"A Cloud Environment for Data-intensive Storage Services", E. Kolodner et al., Third IEEE International Conference on Cloud Computing Technology Science, dated 2011, pp. 1-10.

Notice of Allowance, dated Jan. 22, 2016, for U.S. Appl. No. 14/073,876 (37.296C1), filed Nov. 6, 2013, invented by Nikhil Khandelwal et al., Total 14 pages.

* cited by examiner

Role Resource Threshold

Node Resource Usage Measurements

Node/Role Assignment Information

Minimum Configuration

| role files | cpu h/1 | nic h/1 | IO tasks h/1 | threshold period (mins) | call home |
|---|---|---|---|---|---|
| int | 90/20 | 95/10 | NA/NA | 30 | 0 |
| strg | 90/20 | NA/NA | 100/10 | 30 | 0 |
| mgmt | 90/20 | 95/0 | NA/NA | 30 | 20 |

Role Resource Threshold Table

FIG. 6

| node | current role | cpu | nic | IO tasks | call homes |
|---|---|---|---|---|---|
| node 1 | mgmt | 10% | 2% | 0 | 2 |
| node 2 | int | 60% | 60% | 0 | 0 |
| node 3 | strg | 60% | 2% | 59 | 0 |
| node 4 | int, strg | 85% | 65% | 50 | 0 |

Measured Role Resource Usage

FIG. 7

| type | count |
|---|---|
| int | 2 |
| strg | 2 |
| mgmt | 1 |

Current Node/Role Assignments

FIG. 8

| type | count |
|---|---|
| int | 1 |
| strg | 2 |
| mgmt | 1 |

Minimum Node/Role Configuration

FIG. 9

MODIFYING AN ASSIGNMENT OF NODES TO ROLES IN A COMPUTING ENVIRONMENT

BACKGROUND OF THE INVENTION

1. Field of the Invention

The present invention relates to a computer program product, system, and method for modifying an assignment of nodes to roles in a computing environment.

2. Description of the Related Art

Cloud storage refers to data storage as a service where storage resources are provided to clients on demand. Cloud storage infrastructures support a multitude of users and services over geographically distributed storage areas. Nodes implementing the cloud storage infrastructure may be assigned certain roles, such as an interface role to provide services to access data in the cloud storage infrastructure from outside the system, a storage role to provide storage services to users, and a management role to manage the cloud storage infrastructure, including the configuration and provisioning of resources and access by users.

Customers with substantial data storage and access needs are provided a cloud infrastructure having multiple nodes for accessing the data and multiple nodes for reading and writing the data onto the back end storage. The customer may purchase nodes for interface and storage capabilities. As customer needs change, customers may need to purchase more node hardware to expand the interface and storage capabilities.

SUMMARY

Provided are a computer program product, system, and method for modifying an assignment of nodes to roles in a computing environment. There are a plurality of resource thresholds for each of a plurality of roles, wherein each role defines a type of operations and node resource usage for the nodes, and a measurement of node resource usage for the nodes. For at least one of the node, operations are performed comprising: determining at least one of the roles assigned to the node; determining a role resource threshold for each role assigned to the node; determining whether the measured node resource usage at the node exceeds the determined role resource thresholds for each role assigned to the node, wherein the role having the determined resource threshold exceeded by the node resource usage comprises a role to adjust; and determining a modification of the assignment of nodes to the role to adjust.

BRIEF DESCRIPTION OF THE DRAWINGS

FIG. 6 illustrates an example of a role resource threshold table.

FIG. 7 illustrates an example of measured role resource usages.

FIG. 8 illustrates an example of current node/role assignments.

FIG. 9 illustrates an example of a minimum node/role configuration.

DETAILED DESCRIPTION

Described embodiments provide techniques for determining when to reassign nodes to roles in a network computing environment based on measurements of node resource usage and particular resource thresholds for the roles.

Figure 1:
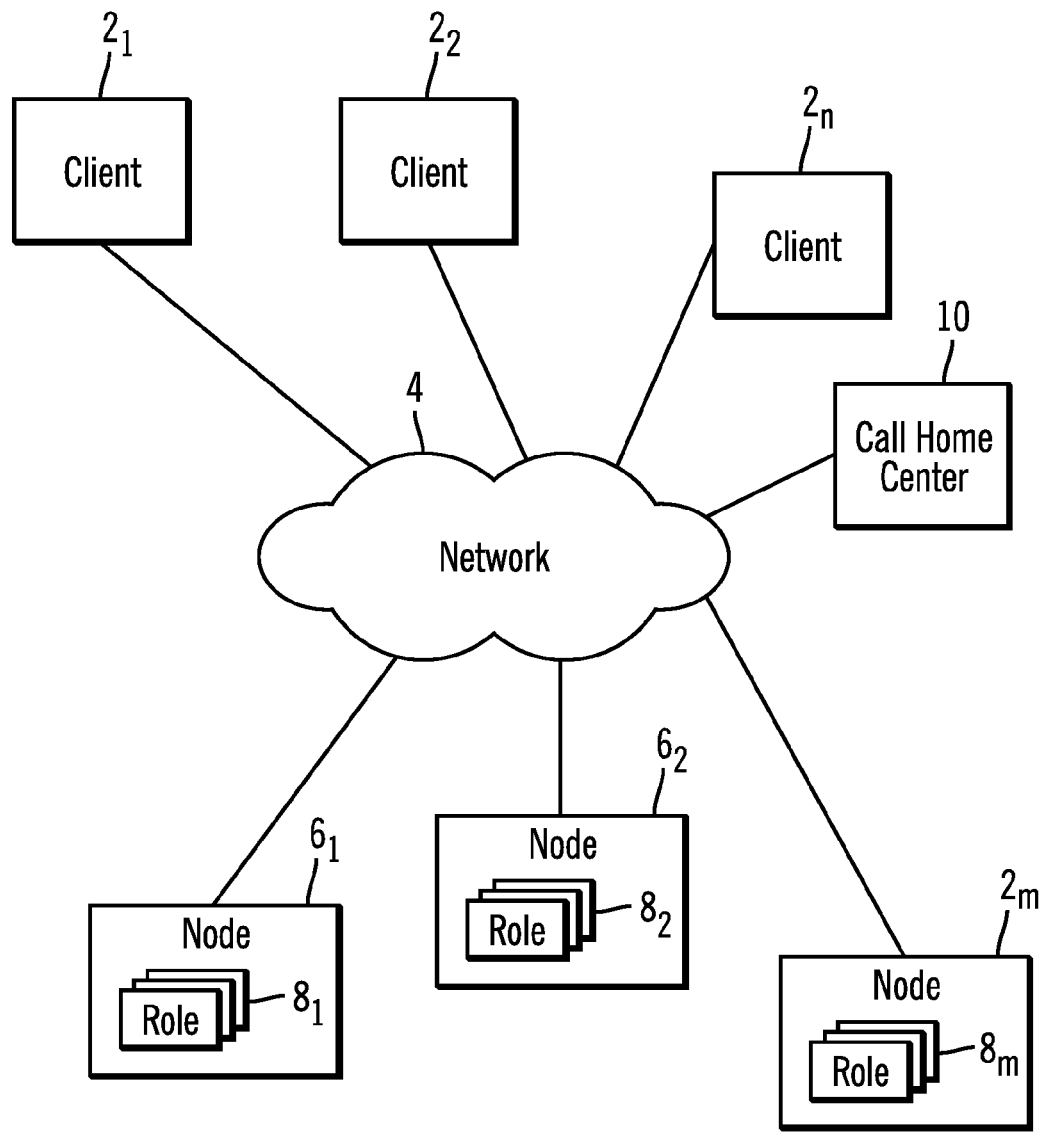
FIG. 1 illustrates an embodiment a network computing environment.

FIG. 1 illustrates an embodiment of a network computing environment, such as a cloud computing environment, where one or more client computers $2_1, 2_2 \ldots 2_n$ access services and storage over a network 4 provided by an infrastructure implemented at a plurality of nodes $6_1, 6_2 \ldots 6_m$. Each node $6_1, 6_2 \ldots 6_m$ may implement one or more roles $8_1, 8_2 \ldots 8_m$ as part of providing cloud based services to the clients $2_1, 2_2 \ldots 2_n$. The roles $8_1, 8_2 \ldots 8_m$ the nodes may implement may comprise an interface role, a management role and a storage role or any other suitable roles that may be implemented by nodes in a cloud computing environment.

A node $6_1, 6_2 \ldots 6_m$ implementing a management role provides an administration interface to the system implemented by the nodes $6_1, 6_2 \ldots 6_m$, and may provide command line interface (CLI) and graphical user interface (GUI) access. Nodes $6_1, 6_2 \ldots 6_m$ implementing an interface role provides services to users at the clients $2_1, 2_2 \ldots 2_n$ to access data from outside the system. Nodes $6_1, 6_2 \ldots 6_m$ implementing a storage role provide back end storage and a file system to store user data. The node implementing the management role may further perform call home messaging on a configured data path to a call home center 10 if an error is detected. The call home message may contain an error code within information on the type of node causing the error, such as interface node, management node, storage node, etc. A call home message may further be used to purchase and request additional hardware resources if needed or request a maintenance visit. The call home center 10 may comprise a facility of the vendor of the hardware implementing nodes $6_1, 6_2 \ldots 6_m$ to which the management node reports hardware problems in order to receive service and support on hardware problems.

The nodes $6_1, 6_2 \ldots 6_m$ may comprise physical machines, such as severs, or they may comprise virtual machines servers implemented on one or more servers or computing devices.

The use of a reference character, such as m, n, j, k is used to denote a variable number of instances of an element, and may take the same or different integer value when used with different instances of a same element or with different elements.

. The network 4 may comprise a network such as a Local Area Network (LAN), Storage Area Network (SAN), Wide Area Network (WAN), the Internet, a peer-to-peer network, wireless network, etc. One example of a cloud computing environment in which embodiments may be implemented is the International Business Machines Corporation ("IBM") Scale Out Network Attached Storage (SONAS) system.

In order to dynamically and actively manage the assignment of roles $8_1, 8_2 \ldots 8_m$ to the nodes $6_1, 6_2 \ldots 6_m$, where one or more roles may be assigned to each node, the management node, comprising one of the nodes $6_1, 6_2 \ldots 6_m$ implementing a management role, may maintain threshold information used to determine whether to reconfigure the assignment of roles to the nodes based on node resource usage implementing the role.

Figure 2:
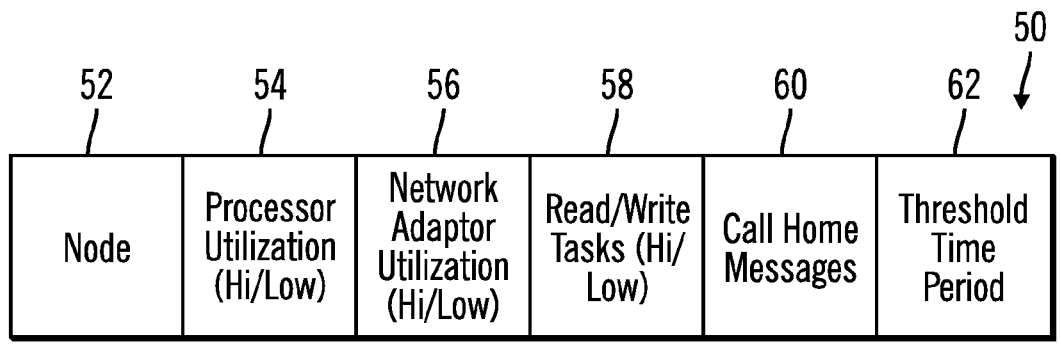
FIG. 2 illustrates an embodiment of role resource thresholds.

FIG. 2 illustrates an embodiment of role threshold information 50 that may be provided for each of the available roles, and may identify the role 52 to which the thresholds apply, e.g., management role, storage role, interface role; processor utilization 54; network adaptor utilization 56; read/write tasks 58; a number of call home messages 60; and a threshold time period 60. The thresholds 54, 56, 58, and 60 may have both high and low thresholds, such that a high threshold is exceeded if the node resource usage is greater than the high threshold and a low threshold is exceeded if the relevant node resource usage is less than the low threshold. Further, a threshold is measured with respect to the threshold time period 62, such that a determination is made as to whether the high and low threshold 52, 54, 56, 58, 60 is exceeded for the threshold time period 62.

Figure 3:
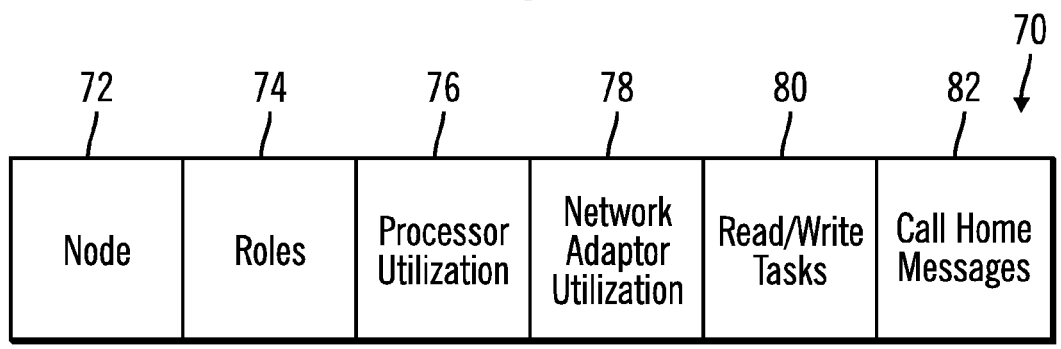
FIG. 3 illustrates an embodiment of node resource usage measurements.

FIG. 3 illustrates an embodiment of node resource usage measurements 70 which may include for each node $6_1, 6_2 \ldots 6_m$ the node identifier 72; the one or more roles 74 assigned to the node 72; a processor utilization 76 at the node 72; a network adaptor utilization 78 at the node 72; a number of read/write tasks at the node 80; and a number of call home messages 82 at the node 72.

Figure 4:
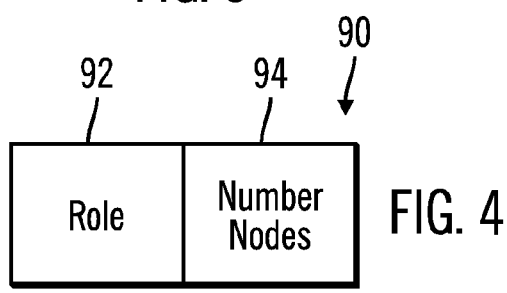
FIG. 4 illustrates an embodiment of node/role assignment information.

FIG. 4 provides an embodiment of node/role assignment information 90 provided for each of the roles $8_1, 8_2 \ldots 8_m$, including a role 92 and a number of nodes 94 assigned to implement that role 92.

Figure 5:
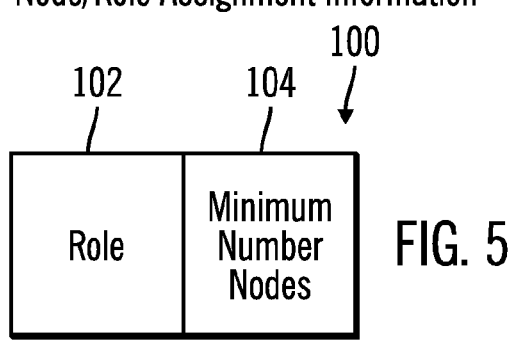
FIG. 5 illustrates a minimum configuration for the assignment of nodes to roles.

FIG. 5 provides an embodiment of a minimum configuration 100 for the roles indicating, for each role, a role 102 and a minimum number of nodes 104 that must be assigned to that role.

The threshold information 50 and minimum configuration 100 may be dynamically adjusted during operations based on observed node resource usage levels so as to reduce the assignment of nodes $6_1, 6_2 \ldots 6_m$ to roles $8_1, 8_2 \ldots 8_m$ during periods of low resource usage levels for the roles and to increase the assignment of nodes $6_1, 6_2 \ldots 6_m$ to roles $8_1, 8_2 \ldots 8_m$ during periods of high resource usage levels for the roles. For instance, during periods of low resource usage, fewer customers may need to access storage resources and interfaces. During these times, the assignment of nodes to the storage and interface roles may be reduced. However, during observed high usage times, additional nodes may need to be assigned to interface and storage roles to provide greater infrastructure to support the increased demand. Analytical tools may be used to set the role resource thresholds to take into account actual usage data as to the optimal assignment of nodes for roles depending on measured node resource usage.

FIG. 6 provides an example of high and low thresholds, as shown in FIG. 2, for nodes assigned one or more of the management (mgmt), interface (int), and storage (strg) roles.

FIG. 7 provides an example of node resource usage measurements 70 taken for four nodes to provide measurements to be compared to the role resource thresholds.

FIG. 8 provides an example of the node/role assignments 90, indicating a current number of nodes assigned to each of the roles.

FIG. 9 provides an example of the minimum node/role configuration 110 of the minimum number of nodes that must be provided for each role.

Figure 10:
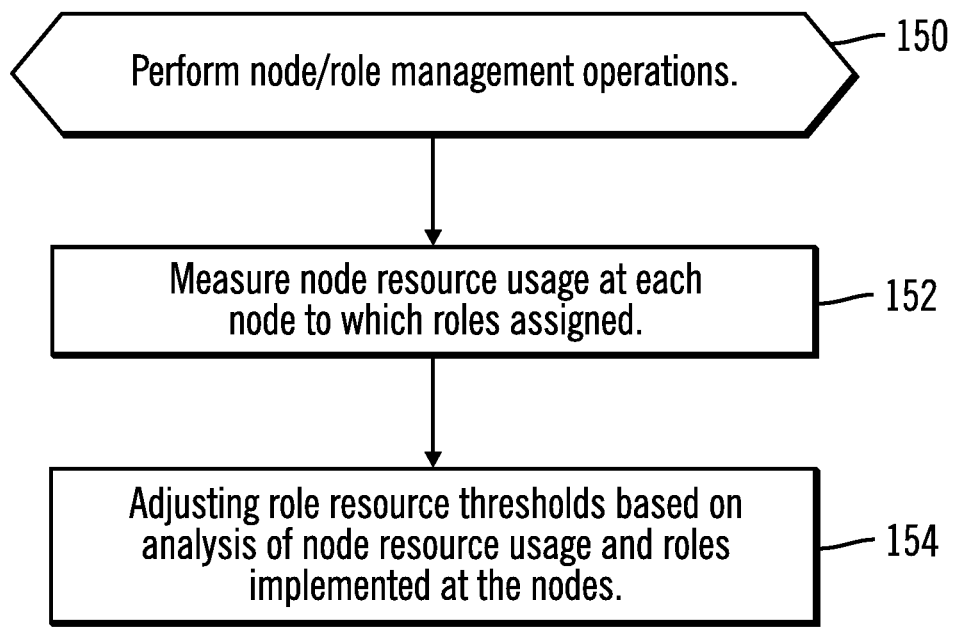
FIG. 10 illustrates an embodiment of node/role management operations.

FIG. 10 illustrates an embodiment of operations performed by a management node, comprising one or more of the nodes $6_1, 6_2 \ldots 6_m$ implementing a management role to perform management operations. Upon initiating (at block 150) management operations, the management node measures (at block 152) node resource usage 70 (FIG. 3) for one or more of the nodes $6_1, 6_2 \ldots 6_m$. The management node may further adjust (at block 154) role resource thresholds 50 based on an analysis of the node resource usage and roles $8_1, 8_2 \ldots 8_m$ during different periods of usage. Various data mining and other analytic tools may be used to dynamically adjust the role resource thresholds 50.

Figure 11A:
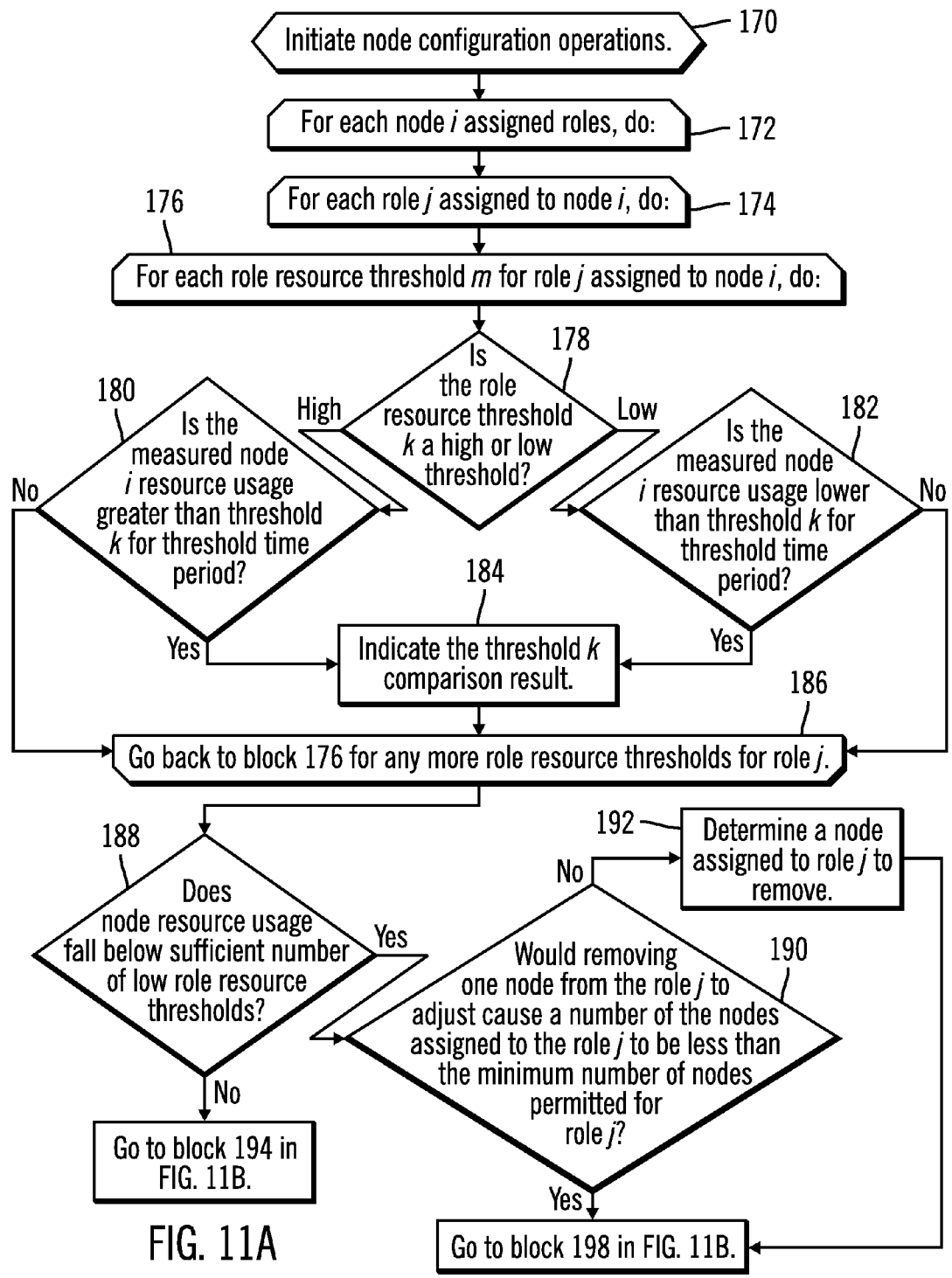
FIGS. 11a and 11b illustrate an embodiment of operations to reassign nodes to roles.
Figure 11B:
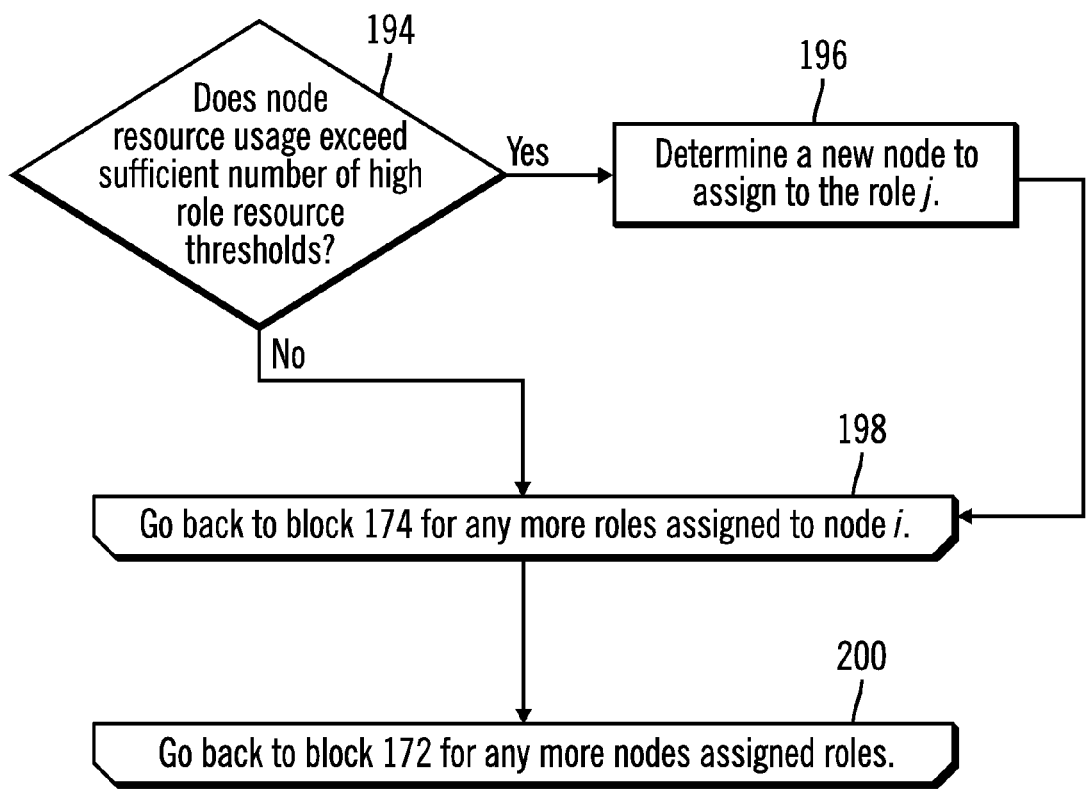

FIGS. 11a and 11b provide an embodiment of operations a management node, comprising one of the nodes $6_1, 6_2 \ldots 6_m$ implementing a management role, performs to configure the node/role assignment based on measured node resource usage and role resource thresholds. One management node may perform the operation of FIGS. 11a, 11b, and 12 for itself and/or for other nodes $6_1, 6_2 \ldots 6_m$ in the network 4. Upon initiating (at block 170) node configuration operations, a loop of operations for each node i (at blocks 172-200) is performed for each role j (at blocks 174-198) assigned to node i. Then for each role resource threshold k for role j, such as processor utilization 54, network adaptor utilization 56, etc., a loop of operations is performed at block 176 through 186 to determine role resource thresholds 50 that were exceeded (on the upper or lower end) by the node resource usages 70.

At block 178, if the role resource threshold k is a high threshold, then the management node determines (at block 180) whether the measured corresponding node resource usage 76, 78, 80, 82 exceeds the corresponding role resource threshold k (e.g., 54, 56, 58, 60) for the threshold time period 60. If (at block 178) the role resource threshold k is a low threshold, then the management node determines (at block 182) whether the measured corresponding node resource usage 76, 78, 80, 82 is less than the corresponding role resource threshold k (e.g., 54, 56, 58, 60) for the threshold time period 60. If the threshold 50 was exceeded at the upper or lower limit, from blocks 180 and 182, then the management node indicates the threshold k comparison result indicating a threshold was exceeded. After indicating (at block 184) the threshold k was exceeded or if (from the no branches of blocks 180 or 182) the measured node i resource usage was not exceeded, then control proceeds to block 186 to consider any more role resource thresholds j.

After considering all the role resource thresholds for role j at node i, the management node determines whether (at block 188) one or more node resource usages 76, 78, 80, 82 fall below a sufficient number of corresponding low resource thresholds 54, 56, 58, 60 for the threshold time period 62. If so, then the management node determines (at block 190) whether removing one node from the role j to adjust would cause a number of the nodes assigned to the role j to be less than the minimum number 104 of nodes permitted for role j, as indicated in the minimum configuration 100 (FIG. 5), and, if so, then control proceeds to block 198 in FIG. 11b without removing a node assigned to role j. If (from the no branch of block 190) removing a node would not cause less than the minimum number 104 of nodes to be assigned, then the management node determines (at block 192) a node assigned to role j to remove. The node to remove may comprise the node i at which the resource usage was measured or another node $6_1, 6_2 \ldots 6_m$, such as a node having a relatively higher node resource usage level, e.g., an over utilized node.

If (at block 188) the node resource usage 76, 78, 80, 82 does not fall below a sufficient number of corresponding low resource thresholds 54, 56, 58, 60, then control proceeds to block 194 in FIG. 11b where the management node determines whether the resource usage 76, 78, 80, 82 exceeds a sufficient number of corresponding high resource thresholds 54, 56, 58, 60. If so, then the management node determines (at block 196) a new node $6_1, 6_2 \ldots 6_m$ to assign to the role j. After reassigning nodes to role j from block 192 or 196 or after determining not to reassign a node from the no branch of block 190 or 194, control proceeds back to block 174 to process any more roles assigned to node i. Otherwise, if all roles for node i have been considered, then control proceeds at block 200 back to block 172 to process any more nodes $6_1, 6_2 \ldots 6_m$ assigned a role. After all nodes are processed, the node reassignment procedure ends.

The determination at block 188 of whether a "sufficient number" of resource thresholds have been exceeded to trigger a modification of the node assignment may comprise just one specific role resource threshold being exceeded or a combination of role resource thresholds that need to be exceeded before modifying the node/role assignment. Further, the "sufficient number" of role resource thresholds required to be exceeded before modifying the assignment of nodes may differ for different roles. For instance, reassignment of nodes for a storage role may occur if only the read/write threshold for the role is exceeded, but the reassignment for an interface role may occur if only the network adaptor utilization threshold is exceeded. Other combinations of thresholds exceeded may also be required as the sufficient number exceeded before reassigning nodes. Further, for one role, there may be multiple different combinations of role resource thresholds that if exceeded result in a reassignment of node resources.

Figure 12:
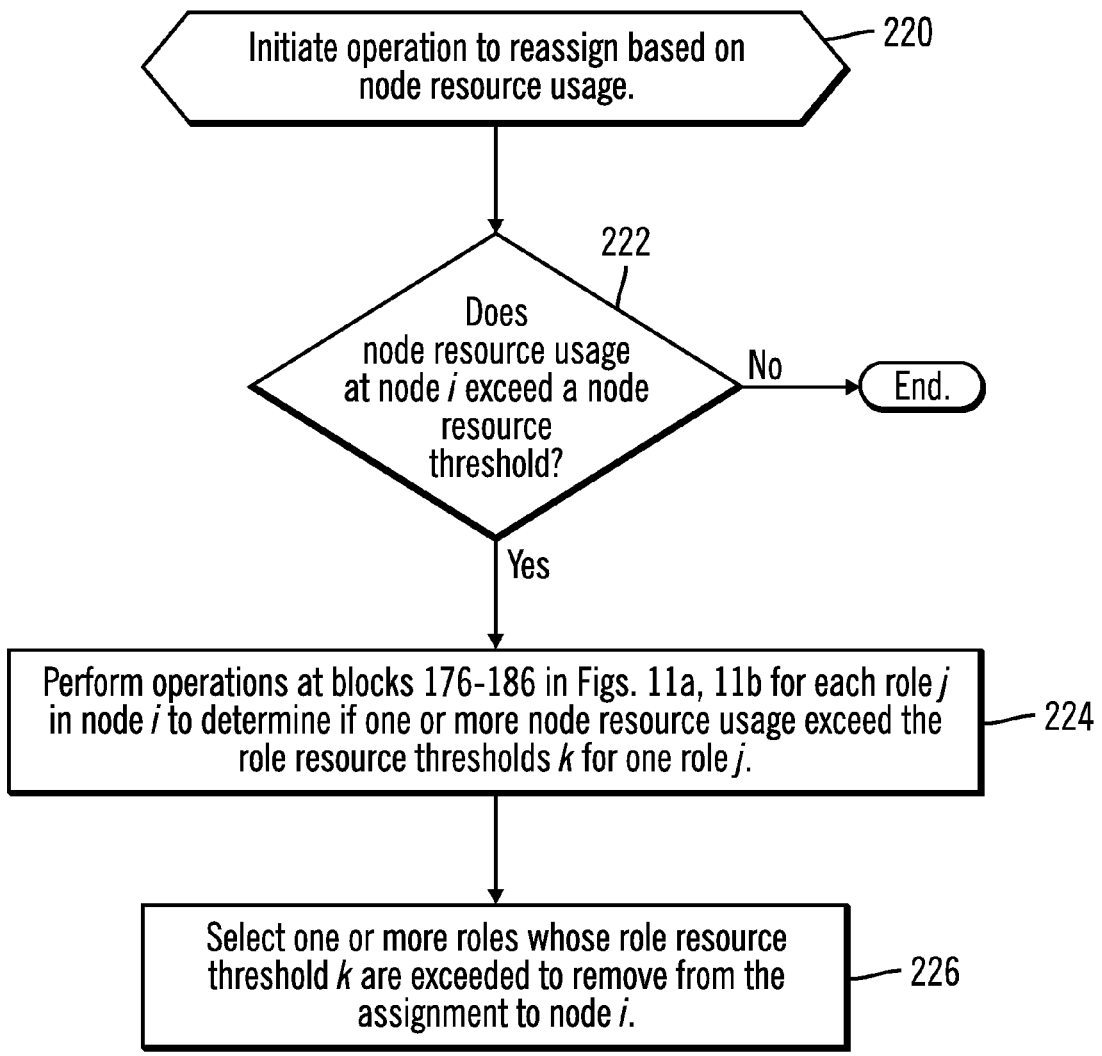
FIG. 12 illustrates an embodiment of operations to reassign roles to a node based on node resource usage.

FIG. 12 provide an embodiment of operations a management node, comprising one of the nodes $6_1, 6_2 \ldots 6_m$ implementing a management role, performs to configure the node/role assignment if a node i, comprising one of the nodes $6_1, 6_2 \ldots 6_m$, is over utilized. Upon initiating (at block 220) an operation to reassign roles to node i based on node resource usage, the management node determines whether one or more of the node resource usages 76, 78, 80, 82 exceeds one or more corresponding node resource thresholds. If not, then node i is not over utilized and control ends. Otherwise, if the node i satisfies an over utilized determination, then the management node performs the operations at blocks 176-186 to determine for each role j whether the node resource thresholds exceed (are greater than or fall below) a specified number of role resource thresholds k for role j. In this way, if the node resource usage at node i exceeds a sufficient number of role resource thresholds, then that role may be removed from the over utilized node to free resources at that node i.

Described embodiments provide techniques for determining whether the node resource usage at a node implementing one or more roles exceeds certain role resource thresholds, which would indicate that that role should be removed from the node if the node resource usage falls below low thresholds for the role or that additional nodes should be assigned to that role if the node resource usage exceeds high role resource thresholds. In this way, the assignment of nodes to roles in a network computing environment may be dynamically adjusted based on the node resource usage. Further, the role resource thresholds may be adjusted based on measured node resource usage to determine whether the thresholds should be adjusted to provide for an optimal assignment of nodes to roles depending on varying resource usage by customers.

Cloud Computing Environment

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 13-15. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
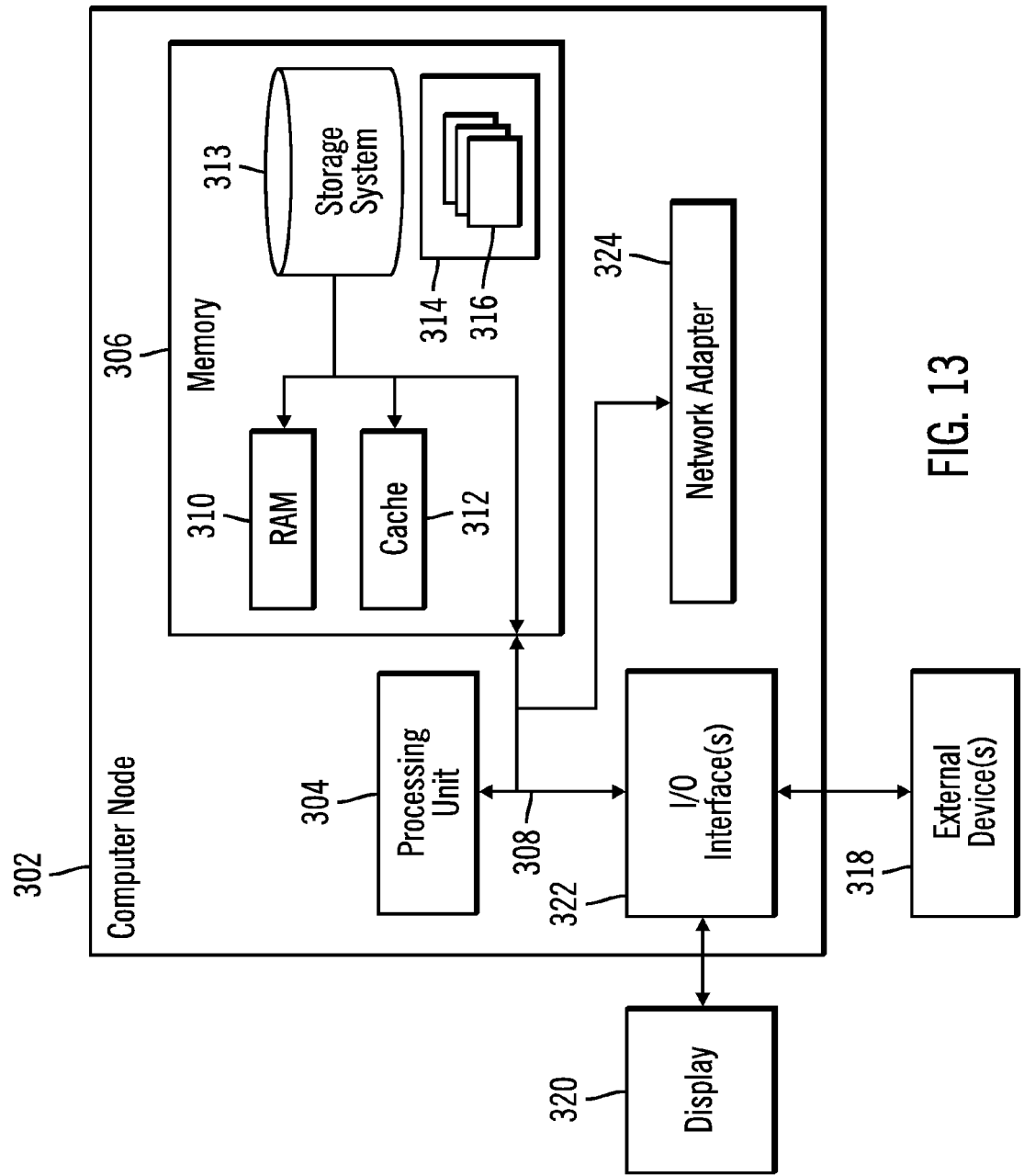
FIG. 13 illustrates an implementation of a node in the network computing embodiment.

FIG. 13 illustrates an embodiment of a cloud computing node 302 which may comprise an implementation of the clients $2_1, 2_2 \ldots 2_n$, the nodes $6_1, 6_2 \ldots 6_m$, and the call home center 10. Cloud computing node 302 is only one example of a suitable cloud computing node and is not intended to suggest any limitation as to the scope of use or functionality of embodiments of the invention described herein. Regardless, cloud computing node 302 is capable of being implemented and/or performing any of the functionality set forth hereinabove.

The cloud computing node 302 may be operational with a general purpose or special purpose computing system environments or configurations. Examples of well-known computing systems, environments, and/or configurations that may be suitable for implementing the node 302 may include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The node 302 may be described in the general context of computer system executable instructions, such as program modules, being executed by a computer system. Generally, program modules may include routines, programs, objects, components, logic, data structures, and so on that perform particular tasks or implement particular abstract data types. The node 302 may be implemented in distributed cloud computing environments where tasks are performed by remote processing devices that are linked through a communications network. In a distributed cloud computing environment, program modules may be located in both local and remote computer system storage media including memory storage devices.

As shown in FIG. 13, the computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The node 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer node 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), Storage Area Network (SAN), a general wide area network (WAN), and/or a public network (e.g., the Internet) via network adapter 324. As depicted, network adapter 324 communicates with the other components of computer node 302 via bus 308. The network adaptor 324 comprises hardware and program code implementing a particular network protocol, such as Ethernet, Fibre Channel, etc. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 14:
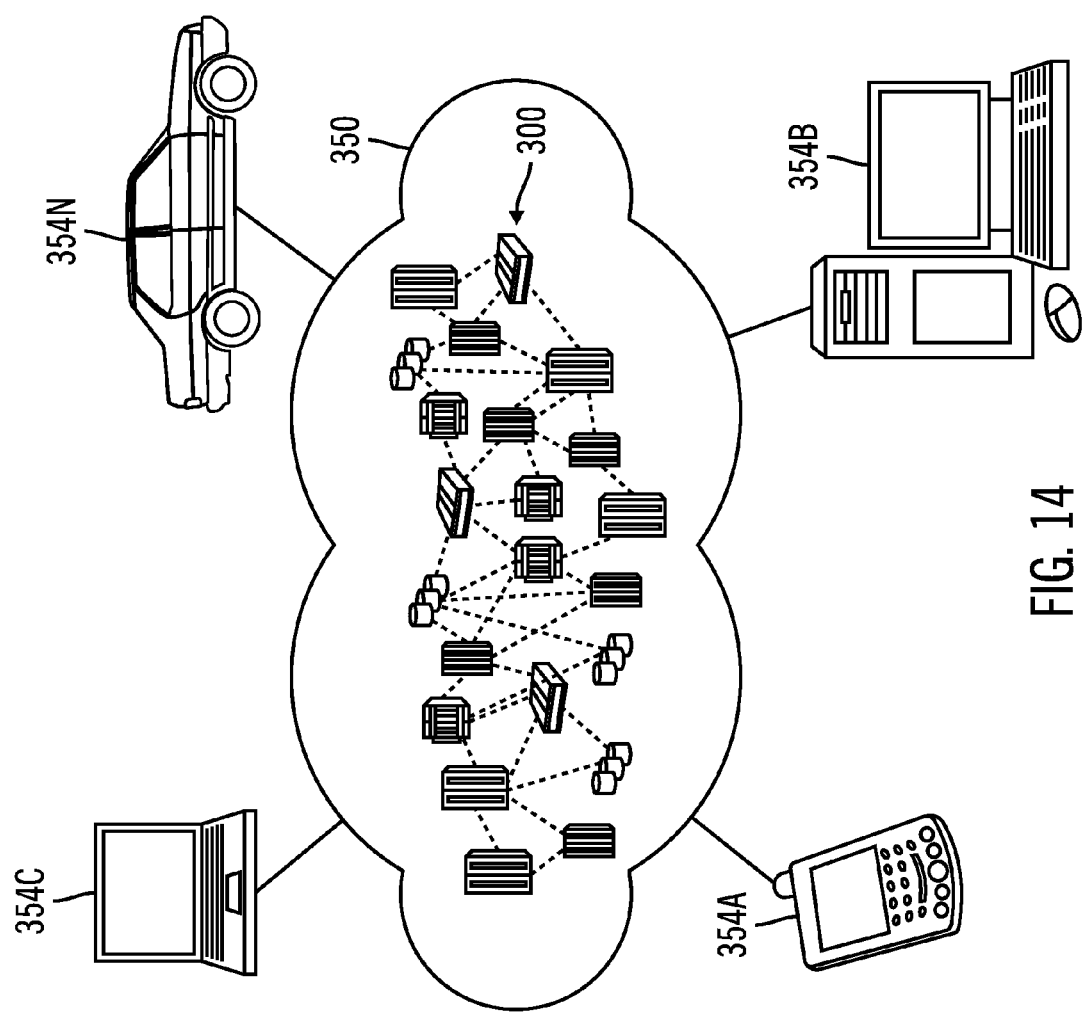
FIG. 14 illustrates an embodiment of a cloud computing environment.

Referring now to FIG. 14, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300, which m ay be implemented as node 302, may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 14 are intended to be illustrative only and that computing nodes 300 and cloud computing environment 350 can communicate with any type of computerized device over any type of network and/or network addressable connection (e.g., using a web browser).

Figure 15:
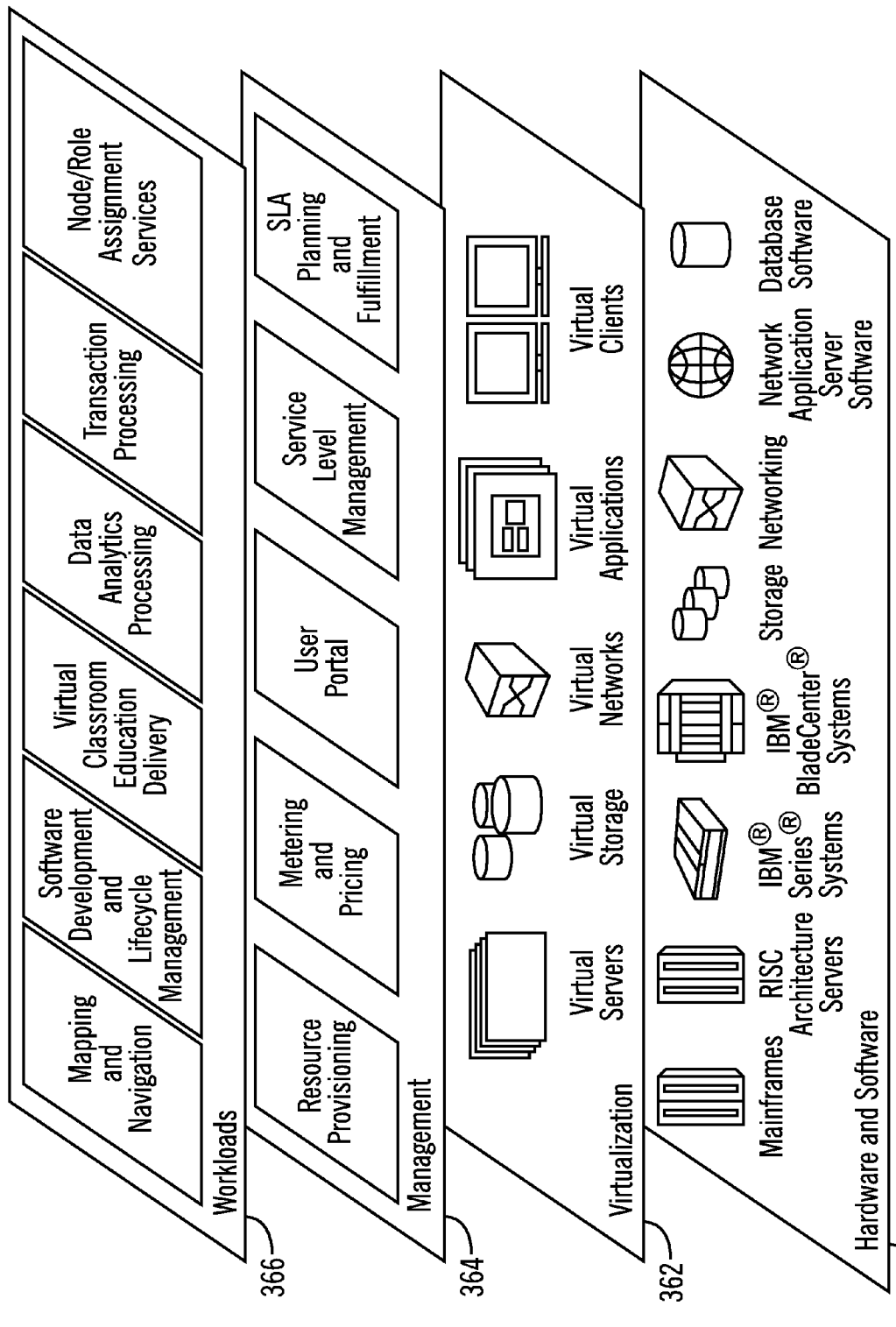
FIG. 15 illustrates an embodiment of abstraction model layers of a cloud computing environment.

Referring now to FIG. 15, a set of functional abstraction layers provided by the cloud computing environment 350 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and role and node assignment services, such as described with respect to FIGS. 1-12, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing nodes in a network, the computer program product comprising a computer readable storage medium having computer readable program code embodied therein that executes to perform operations, the operations comprising:

provinding a plurality of resource thresholds for each of a plurality of roles, wherein each of the roles defines a type of operations, wherein each of the nodes assigned to one of the roles performs the type of operations for the role, wherein, in an assignment, at least one of the nodes is assigned multiple roles to implement the multiple roles assigned to the node;

providing a measurement of node resource usage for the nodes; and for at least one of the nodes to which a plurality of the roles are assigned, performing:

determining at least one of the roles assigned to the node;

determining a determined role resource threshold for each of the roles assigned to the node;

determining whether the node is over utilized by determining whether the measured node resource usage at the node exceeds the determined role resource threshold for each of the roles assigned to the node, wherein the role having the determined roll resource threshold exceeded by the node resource usage comprises the role to adjust; and determining a modification of the assignment of the nodes to the role to adjust in response to determining that the node is over utilized.

2. The computer program product of claim 1, wherein the determining whether the node resource usage exceeds at least one of the determined role resource threshold comprises determining that the node resource usage is greater than an upper role resource threshold for one of the roles assigned to the node, wherein the determined modification comprises determining an additional of the nodes to assign to the role to adjust.

3. The computer program product of claim 2, wherein the operations further comprise:
   determining whether a number of the nodes assigned to the role comprises a total number of available nodes; and
   transmitting an electronic message indicating to add additional node capacity.

4. The computer program product of claim 1, wherein the operations further comprise:
   determining whether the node resource usage is less than a lower role resource threshold for one of the roles assigned to the node; and
   determining at least one of the nodes assigned to the role to adjust to remove from the assignment of the nodes to the role to adjust in response to the node resource usage being less than the lower role resource threshold.

5. The computer program product of claim 4, wherein the operations further comprise:
   maintaining an indication of a minimum number of the nodes to assign to each of the roles; and
   determining whether removing one of the nodes assigned to the role to adjust would cause a number of the nodes assigned to the role to adjust to be less than the minimum number of the nodes when the node resource usage is less than the lower role resource threshold, wherein the determined modification to remove one of the nodes is performed in response to determining that removing one of the nodes assigned to the role to adjust would not cause the number of the nodes to fall below the minimum number of the nodes.

6. The computer program product of claim 1, wherein the operations further comprise:
   determining whether the node resource usage at one of the nodes exceeds a node resource threshold;
   wherein the operations of the determining the at least one of the roles, the determining the determined role resource threshold, the determining whether the measured node resource usage exceeds the determined role resource threshold, and the determining the modification are performed for the node to adjust comprising one of the nodes having the node resource usage that exceeds the node resource threshold.

7. The computer program product of claim 1, wherein the modification of the assignment of the nodes comprises removing the assignment of the node having the node resource usage that exceeds the determined role resource threshold.

8. The computer program product of claim 1, wherein the roles for the nodes comprises a management role, an interface role, and a storage role, wherein there are different role resource thresholds assigned to the management role, the interface role, and the storage role.

9. The computer program product of claim 1, wherein for at least one of the determined role resource threshold assigned to each of the roles there is an upper role resource threshold and lower role resource threshold and a threshold time period, wherein the determining whether the measured node resource usage exceeds the determined role resource threshold comprises determining whether the node resource usage is greater than the upper role resource threshold or less than the lower role resource threshold for the threshold time period.

10. The computer program product of claim 1, wherein the role resource thresholds comprise at least one of a processor utilization at the node for the role, a network card utilization at the node for the role, and a number of read and write tasks at the node for the role, and a number of notifications generated to provision additional resources for the role.

11. A system for managing nodes in a network, comprising:
   a management node, comprising one of the nodes in the network, having a processor and a computer readable storage medium including code executed by the processor to perform operations, the operations comprising:
      providing a plurality of resource thresholds for each of a plurality of roles, wherein each of the roles defines a type of operations, wherein each of the nodes assigned to one of the roles performs the type of operations for the role, wherein in an assignment, at least one of the nodes is assigned multiple roles to implement the multiple roles assigned to the node;
      providing a measurement of node resource usage for the nodes; and
      for at least one of the nodes to which a plurality of the roles are assigned, performing:
         determining at least one of the roles assigned to the node;
         determining a determined role resource threshold for each of the roles assigned to the node;
         determining whether the node is over utilized by determining whether the measured node resource usage at the node exceeds the determined role resource threshold for each of the roles assigned to the node, wherein the role having the determined role resource threshold exceeded by the node resource usage comprises the role to adjust; and
         determining a modification of the assignment of the nodes to the role to adjust in response to determining that node is over utilized.

12. The system of claim 11, wherein the determining whether the node resource usage exceeds at least one of the determined role resource threshold comprises determining that the node resource usage is greater than an upper role resource threshold for one of the roles assigned to the node, wherein the determined modification comprises determining an additional of the nodes to assign to the role to adjust.

13. The system product of claim 12, wherein the operations further comprise:
   determining whether a number of the nodes assigned to the role comprises a total number of available nodes; and
   transmitting an electronic message indicating to add additional node capacity.

14. The system of claim 11, wherein the operations further comprise:
   determining whether the node resource usage is less than a lower role resource threshold for one of the roles assigned to the node; and
   determining at least one of the nodes assigned to the role to adjust to remove from the assignment of the nodes to the role to adjust in response to the node resource usage being less than the lower role resource threshold.

15. The system of claim 14, wherein the operations further comprise:
   maintaining an indication of a minimum number of the nodes to assign to each of the roles; and determining whether removing one of the nodes assigned to the role to adjust would cause a number of the nodes assigned to the role to adjust to be less than the minimum number of the nodes when the node resource usage is less than the lower role resource threshold, wherein the determined modification to remove one of the nodes is performed in response to determining that removing one of the nodes assigned to the role to adjust would not cause the number of the nodes to fall below the minimum number of the nodes.

16. The system of claim 11, wherein the operations further comprise:
    determining whether the node resource usage at one of the nodes exceeds a node resource threshold;
    wherein the operations of determining the at least one of the roles, the determining the determined role resource threshold, determining whether the measured node resource usage exceeds the determined role resource threshold, and the determining the modification are performed for the node to adjust comprising one of the nodes having the node resource usage that exceeds the node resource threshold.

17. The system of claim 11, wherein the roles for the nodes comprises a management role, an interface role, and a storage role, wherein there are different role resource thresholds assigned to the management role, the interface role, and the storage role.

18. The system of claim 11, wherein for at least one of the determined role resource threshold assigned to each of the roles there is an upper role resource threshold and lower role resource threshold and a threshold time period, wherein the determining whether the measured node resource usage exceeds the determined role resource threshold comprises determining whether the node resource usage is greater than the upper role resource threshold or less than the lower role resource threshold for the threshold time period.

19. The system of claim 11, wherein the modification of the assignment of the nodes comprises removing the assignment of the node having the node resource usage that exceeds the determined role resource threshold.

20. The system of claim 11, wherein the role resource thresholds comprise at least one of a processor utilization at the node for the role, a network card utilization at the node for the role, and a number of read and write tasks at the node for the role, and a number of notifications generated to provision additional resources for the role.

* * * * *